United States Patent
Fang et al.

(10) Patent No.: US 9,796,898 B2
(45) Date of Patent: Oct. 24, 2017

(54) SINGLE CRYSTAL ALUMINA FILLED DIE ATTACH PASTE

(71) Applicant: Henkel AG & Co. KGaA, Duesseldorf (DE)

(72) Inventors: Long Fang, Shanghai (CN); Wangsheng Fang, Shanghai (CN); Wei Yao, Shanghai (CN)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 15/255,229

(22) Filed: Sep. 2, 2016

(65) Prior Publication Data

US 2016/0369150 A1   Dec. 22, 2016

Related U.S. Application Data

(63) Continuation of application No. PCT/CN2014/072991, filed on Mar. 6, 2014.

(51) Int. Cl.
| | | |
|---|---|---|
| C09K 5/14 | (2006.01) |
| C08K 3/22 | (2006.01) |
| C08L 83/04 | (2006.01) |
| C08K 5/05 | (2006.01) |
| C08K 7/00 | (2006.01) |
| C09J 183/04 | (2006.01) |
| C08G 77/12 | (2006.01) |
| C08G 77/20 | (2006.01) |

(52) U.S. Cl.
CPC ............... *C09K 5/14* (2013.01); *C08K 3/22* (2013.01); *C08K 5/05* (2013.01); *C08K 7/00* (2013.01); *C08L 83/04* (2013.01); *C09J 183/04* (2013.01); *C08G 77/12* (2013.01); *C08G 77/20* (2013.01); *C08K 2003/2227* (2013.01); *C08K 2201/005* (2013.01); *C08K 2201/006* (2013.01); *C09J 2203/326* (2013.01)

(58) Field of Classification Search
None
See application file for complete search history.

(56) References Cited

U.S. PATENT DOCUMENTS

| 3,159,601 A | 12/1964 | Ashby |
|---|---|---|
| 3,159,662 A | 12/1964 | Ashby |

(Continued)

FOREIGN PATENT DOCUMENTS

| CN | 101921489 | 12/2010 |
|---|---|---|
| CN | 103314038 | 9/2013 |

(Continued)

OTHER PUBLICATIONS

Product data sheet for high purity alumina from Sumitomo Chemical, 6 pages, no date given.*

(Continued)

*Primary Examiner* — Robert S Loewe
(74) *Attorney, Agent, or Firm* — James J. Cummings

(57) ABSTRACT

A die attach paste composition comprising (a) an organosilicone resin; (b) a single crystal alumina filler; (c) a hardener; and (d) an inhibitor. By using single crystal alumina filler in a silicone based die attach paste, thermal conductivity and anti-yellowing properties are improved in comparison with other spherical alumina particles at the same filler loading content.

14 Claims, 2 Drawing Sheets

(56) References Cited

U.S. PATENT DOCUMENTS

| | | | |
|---|---|---|---|
| 3,516,946 A | 6/1970 | Modic | |
| 3,775,452 A | 11/1973 | Karstedt | |
| 3,814,730 A | 6/1974 | Karstedt | |
| 4,029,629 A | 6/1977 | Jerman | |
| 8,093,331 B2 * | 1/2012 | Fukui | C08L 83/04 106/287.15 |
| 2005/0004305 A1 * | 1/2005 | Yamada | C08L 83/04 524/588 |
| 2007/0219312 A1 * | 9/2007 | David | C09J 183/04 524/588 |
| 2008/0090380 A1 * | 4/2008 | Gardner | C09J 5/06 438/455 |
| 2009/0258216 A1 * | 10/2009 | Yamakawa | H01L 33/56 428/323 |
| 2009/0304961 A1 | 12/2009 | Taguchi et al. | |
| 2010/0051855 A1 * | 3/2010 | Kunitomo | C01F 7/02 252/75 |
| 2011/0311767 A1 * | 12/2011 | Elahee | C08K 5/11 428/138 |
| 2012/0286220 A1 * | 11/2012 | Takasu | C08L 83/04 252/582 |
| 2013/0023109 A1 * | 1/2013 | Harkness | C09J 5/06 438/458 |
| 2013/0248163 A1 * | 9/2013 | Bhagwagar | C08K 5/34 165/185 |
| 2013/0256742 A1 | 10/2013 | Harkness et al. | |
| 2013/0344632 A1 * | 12/2013 | Becker | C08K 5/12 438/26 |
| 2014/0008697 A1 * | 1/2014 | Harkness | C08L 83/04 257/100 |
| 2015/0361320 A1 * | 12/2015 | Tang | C08L 83/14 427/397.7 |
| 2016/0009954 A1 * | 1/2016 | Hanson | C08K 3/36 29/825 |
| 2016/0086713 A1 * | 3/2016 | Iwata | C09K 5/14 336/55 |
| 2016/0197025 A1 * | 7/2016 | Bhagwagar | C09J 183/04 257/717 |
| 2016/0319079 A1 * | 11/2016 | Koellnberger | C09D 183/06 |

FOREIGN PATENT DOCUMENTS

| | | | |
|---|---|---|---|
| JP | 5561042 | 5/1980 | |
| JP | 2004269562 | 9/2004 | |
| JP | WO 2014104080 A1 * | 7/2014 | C08K 3/22 |
| WO | 201212766 | 10/2012 | |

OTHER PUBLICATIONS

International Search Report issued in connection with International Patent Application No. PCT/CN2014/072991 dated Dec. 10, 2014.

* cited by examiner

SINGLE CRYSTAL ALUMINA FILLED DIE ATTACH PASTE

TECHNICAL FIELD

This invention relates to a die attach paste comprising single crystal alumina filler having improved thermal conductivity and anti-yellowing properties.

BACKGROUND OF THE INVENTION

Electronic devices and components generate heat and in many applications, the heat needs to be effectively dissipated for the device function. Polymeric resins have extremely low thermal conductivity in comparison with other inorganic substance such as a metal material, and therefore, it is difficult to release the generated heat. There have been several attempts to obtain a highly thermal conductive resin composition by incorporating fillers with high bulk thermal conductivity.

Generally, fillers can be divided into three types: electrical conductive, semi-conductive and electrical insulation. Electrical conductive fillers include metals such as Au, Ag and Cu for example and metal alloys. Graphite and carbon fiber can be regarded as semi-conductive fillers, since electrical insulation property is reduced when they are used. Therefore, electrical conductive and semi-conductive fillers are not suitable for electronic device applications, even they have very high thermal conductivity.

Electrical insulation fillers are widely used in light-emitting diode (LED) technology for providing high thermal conductivity and good electrical insulation properties. Examples of such fillers are AlN, BN, $Si_3N_4$, $Al_2O_3$ and diamond. AlN and BN are widely considered to have high bulk thermal conductivity, however, the application of AlN and BN is limited due to their hydrolysis reaction and the environmental hazards. On the other hand, diamond provides good physical properties as well as extremely high thermal conductivity, however, high cost creates a problem in wider use. $Al_2O_3$ provides good thermal conductivity as well as other physical properties and the costs are reasonable.

Heat dissipation remains one of the big challenges for LED chips. Heat dissipation depends on thermal conductivity of die attach paste between the chip and the substrate.

During recent developments in the electronic industry, the chips for LED applications have became smaller and thinner, which requires that the bond line thickness of die attach paste need to be evermore thinner. This creates limits for the filler's particle size as the fillers with large particle size hinder the formation of thin bond line thickness of die attach paste. Obviously, the fillers with small particle size decrease the bond line thickness of die attach paste. However, small particle size does not necessary provide adequate heat dissipation. In general high thermal conductive fillers, such as spherical alumina particles with lower particle size cannot meet high thermal conductive requirement while larger particle size cannot meet the requirement of lower bond line thickness for die attach paste. More specifically, for example small spherical $Al_2O_3$ filler particles do not meet the thermal conductivity requirement for LED applications.

In addition, anti-yellowing properties have become very important feature for die attach pastes used in the LED application as die attach paste is exposed for high temperatures for a long time. Above mentioned small spherical $Al_2O_3$ filler particles do not have very good anti-yellowing properties either.

Therefore, it is objective of the present invention to provide a die attach paste with good heat dissipation and anti-yellowing properties in combination with capability to form thin bond line thickness.

SUMMARY OF THE INVENTION

The present invention provides a die attach paste composition comprising (a) a organosilicone resin; (b) a single crystal alumina filler; (c) a hardener; and (d) an inhibitor.

Furthermore, the present invention encompasses use of die attach paste composition according to the present invention to attach die on to a surface.

DETAILED DESCRIPTION

Figure 1:
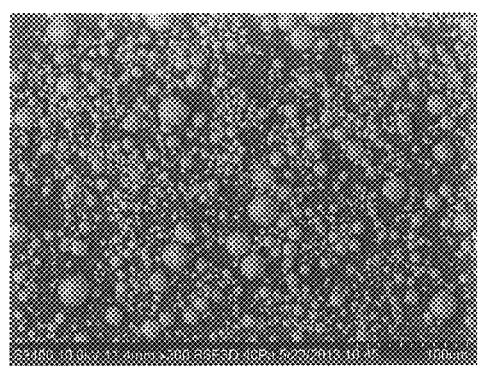
FIG. 1 is a scanning electron microscope (SEM) image of spherical alumina.

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

It has been found out that the shape of the filler particles have impact on thermal conductivity. In the present invention, single crystal alumina filler with fine particle size and narrow particle size distribution in combination with specific particle shape are used in a die attach paste. It has been found that high thermal conductivity and lower bond line thickness can be accomplished. Furthermore, anti-yellowing properties are also improved in comparison with ordinary spherical alumina particles.

Each of the essential components of the die attach paste according to the present invention are described in details below. The die attach paste according to the present invention provides high thermal conductivity, excellent anti-yellowing properties. Furthermore, the die attach paste according to the present invention provides good adhesion strength and thin bond line thickness.

The die attach paste according to present invention comprises (a) an organosilicone resin; (b) a single crystal alumina filler; (c) a hardener; and (d) an inhibitor.

Organosilicone Resin

A wide variety of known organosilicone resins can be used in the present invention. Organosilicone resin is a kind of polyorganosiloxane with a crosslinked structure. Typically, the preparation of organosilicone resins starts from organosilanes by hydrolytic condensation of the organosilanes and then followed by rearrangement. Silicone resins having reactive groups, such as hydroxyl, hydrogen atom, alkoxy and vinyl, directly bonded to the silicon atom may be prepared. Silicone resins have excellent properties such as heat and weathering resistance, good electronic insulation, chemical resistance, hydrophobicity and flame retardancy.

Organosilicone resin according to the present invention preferably comprises reactive groups selected from the groups consisting of hydride functional group and vinyl functional group. These functional groups provide high performance in anti-yellowing properties and adhesion strength.

Organosilicone resin according to the present invention is preferably mixture of organosilicone resin comprising vinyl functional groups and organosilicone resin comprising hydride functional groups.

Vinyl silicone resins having straight chain with low viscosity are found to be particularly suitable in the present invention. Example of this kind of structure is exemplified in the formula I below.

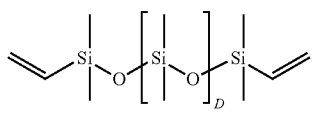
(I)

wherein D>0, the number of vinyl groups per molecule is 2, and the content of vinyl groups is 0.01-3 mmol/g based on the total weight of the vinyl hydrogen silicone.

More preferred vinyl silicone resin is exemplified in formula II below.

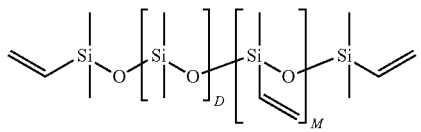
(II)

wherein D>0 and M>0, the number of vinyl groups per molecule 3, and the content of vinyl groups is 0.1-3 mmol/g based on the total weight of the vinyl hydrogen silicone.

Another preferred silicone resin is so called Q-resin with network structure, as exemplified in formula III below.

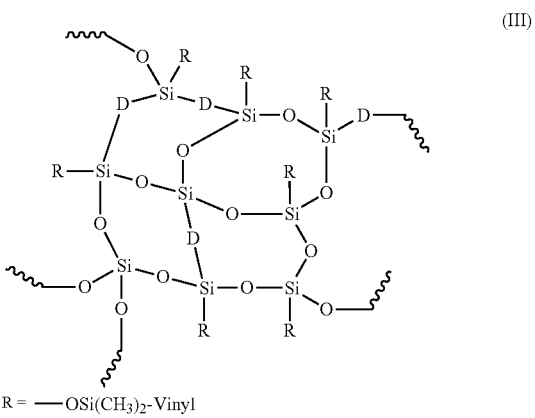
(III)

VQM: R = —OSi(CH$_3$)$_2$-Vinyl wherein the number of vinyl groups per molecule 3, and the content of vinyl groups is 0.1-3 mmol/g based on the total weight of the vinyl hydrogen silicone.

Vinyl silicone resins having straight chain with low viscosity are found to be particularly suitable in the present invention either one resin alone or mixture of two or more resins.

Preferred vinyl silicone resins having straight chain are selected from the group consisting of formulas I, II, III and mixtures thereof. Formula II being preferred and most preferred being formula III.

Preferred combination is mixture of formulas I and II. The most preferred combination is mixture of formulas I and III, which provides high adhesion strength and low viscosity.

Suitable organosilicone resin comprising vinyl functional groups to be used in the present invention are selected from the group consisting of vinyl terminated polydimethylsiloxane, vinyl terminated polyphenylmethylsiloxane, vinyl terminated diphenylsiloxane-dimethylsiloxane copolymer, vinylphenylmethyl terminated vinylphenylsiloxane-phenylmethylsiloxane copolymer, vinyl terminated trifluoropropylmethylsiloxane-dimethylsiloxane copolymer, vinyl Q resins and mixtures thereof.

Suitable commercially available vinyl silicone resins to be used in the present invention are for example VQM1 and VQM0.6 from AB Specialty Silicones CO., LTD., VQM809 and VQM881 from Evonik Specialty Chemicals CO., LTD.

Organosilicone resin comprising hydride functional groups is used as a crosslinker for vinyl-functional organosilicone resins.

One suitable organosilicone resin comprising hydride functional groups is a liquid hydrosilicone resin, which has an average compositional formula (IV):

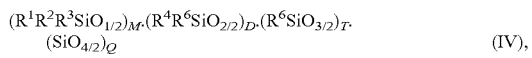
(IV), wherein $R^1$ to $R^6$ are identical or different radicals independently selected from the group consisting of organic groups and a hydrogen atom, with the proviso that at least one of $R^1$ to $R^6$ is a hydrogen atom bonded directly to a silicon atom, and M, T, and Q each represent a number ranging from 0 to less than 1, D represents a number larger than 0 and less than 1, M+D+T+Q=1, and T+Q>0; and has an average of at least two hydrogen atoms bonded directly to a silicon atom per molecule and preferably a weight-average molecular weight of 500-35000 g/mol, preferably from 1000 to 30000 g/mol.

Suitable hydrosilicone oil comprises a linear hydrosilicone oil of the following formula (V):

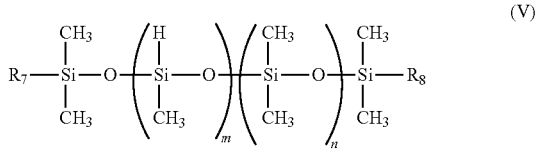

(V)

in which $R_7$ and $R_8$ are identical or different and are each independently methyl or hydrogen, m>0, n≥0, the number of Si—H groups per molecule≥3, and the content of hydrogen atoms directly bonded to Si-atoms is 0.1-1.6 wt % based on the total weight of the hydrosilicone oil.

Suitable hydrosilicone oil may comprise a cyclic hydrosilicone oil of the following formula (VI):

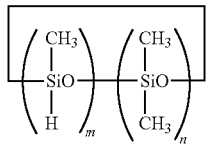

(VI)

in which m>0, n≥0, the number of Si—H groups per molecule≥3, and the content of hydrogen atoms directly bonded to Si-atoms is 0.1-1.6 wt % based on the total weight of the hydrosilicone oil.

Suitable hydrosilicone oil may comprise another preferred silicone resins having a compositional formula (VII):

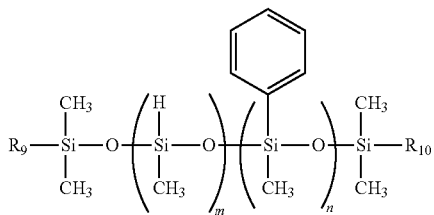

(VII)

wherein $R_9$ and $R_{10}$ are identical or different and are each independently methyl or hydrogen, m>0, n≥0, the number of Si—H groups per molecule≥3, and the content of hydrogen atoms directly bonded to Si-atoms is 0.1-1.6 wt % based on the total weight of the hydrosilicone oil.

Suitable hydrosilicone oil may comprise yet another preferred silicone resins having a compositional formula (VIII):

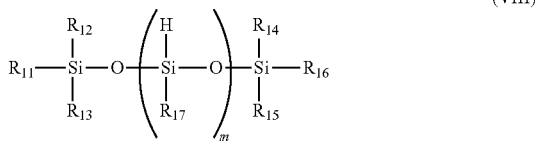

(VIII)

in which $R_{11}$, $R_{12}$, $R_{13}$, $R_{14}$, $R_{15}$, $R_{16}$ and $R_{17}$ are identical or different and are each independently methyl or ethyl, m>0, the number of Si—H groups per molecule 1, and the content of hydrogen atoms directly bonded to Si-atoms is 0.1-1.6 wt % based on the total weight of the hydrosilicone oil.

Suitable organosilicone resin comprising hydride functional group to be used in the present invention is selected from the group consisting of trimethylsilyl terminated methyl hydrogen silicone, octamethylcyclotetrasiloxane, hydrogen terminated polydimethylsiloxane, hydride terminated poly(methyl-phenyl) siloxane, trimethylsilyl terminated dimethyl siloxane-methyl hydrogen siloxane copolymer, trimethylsilyl terminated methylhydrosiloxane dimethylsiloxane copolymer, hydride terminated methylhydrosiloxane dimethylsiloxane copolymer, dimethyl methylhydrogen siloxane copolymer, trimethyl or hydrogen terminated dimethyl methyhydrogen methylphenyl polysiloxane copolymer and mixtures thereof.

Preferred organosilicone resin comprising hydride functional group to be used in the present invention is selected from the group consisting of trimethylsilyl terminated methyl hydrogen silicone, dimethyl methylhydrogen siloxane copolymer, hydride terminated methylhydrosiloxane dimethylsiloxane copolymer and mixtures thereof.

Suitable commercially available hydrogen silicone resins to be used in the present invention are for example Hydrogen Silicone Crosslinker 110 manufactured by Evonik Specialty Chemicals CO., LTD. and hydrogen Silicone SYL-OFF® 7672 and 7028 Crosslinker manufactured by Dow Corning (China) Holding CO., LTD.

Preferred organosilicone resins provide high adhesion strength and low viscosity for the die attach paste according to the present invention. The low viscosity of the organosilicone resin allows a high percent loading of the filler to approach higher thermal conductivity.

The ratio of vinyl functional groups to hydride functional groups has impact on adhesion strength. Preferably the ratio of vinyl functional groups to hydride functional groups is from 1:0.2 to 1:10, more preferably from 1:0.5 to 1:5 and most preferably from 1:2 to 1:2.5.

Alkali and halide ions can migrate to the bond areas and result in undesirable conditions including corrosion. Preferably the suitable organosilicone resins used in the present invention are free of alkali and halide ions.

A die attach paste according to the present invention comprises organosilicone resin preferably from 15% to 40% by weight of total paste composition, more preferably from 17% to 37% and most preferably from 22% to 32%.

Filler

The die attach paste according to the present invention comprises a single crystal alumina filler. Suitable filler to be used herein needs to meet requirements for thermal conductive and electrical insulation. Single crystal $Al_2O_3$ based filler is used, due to its desirable combination of high thermal conductivity and electrical insulation.

Generally, $Al_2O_3$ filler with spherical structure (FIG. 1) provide a high percent loading of the filler in the die attach paste. However, the spherical shape—even with a small particle size does not provide low bond line thickness. In addition, $Al_2O_3$ filler with spherical structure also contain part, which has poly crystalline structure—about 20%, and remaining part—about 80% being amorphous.

Therefore, it is preferred that the single crystal $Al_2O_3$ filler has a high degree of crystallinity. Preferably, the crystallinity is at least 85%, more preferably at least 95% and most preferably at least 99%. High degree of crystallinity has positive impact on thermal conductivity and anti-yellowing properties.

Figure 2:
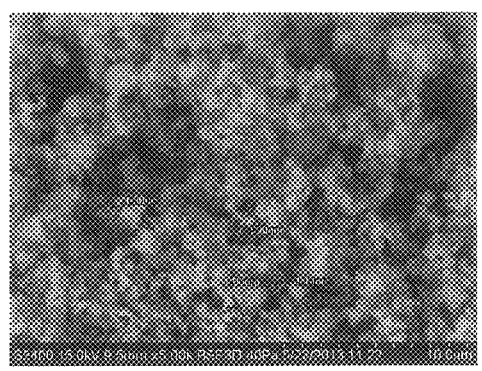
FIG. 2 is a SEM image of single crystal alumina used in the present invention.

It has been surprisingly found that single crystal $Al_2O_3$ with ellipsoidal shape (FIG. 2) provides low bond line thickness and higher thermal conductivity. Ellipsoidal shape provides larger conductive area in comparison to spherical shape. Furthermore, a single crystal $Al_2O_3$ with ellipsoidal shape can increase the interfacial area between different particles in comparison with spherical particles so that the thermal conductive network can be formed easily, which is benefit for thermal dissipation. Therefore, it is preferred that the single crystal alumina filler has an ellipsoidal shape.

The single crystal alumina filler according to present invention has particle size from 0.65 µm to 6 µm, preferably from 1 µm to 5.5 µm and more preferably from 2 µm to 5 µm. Particle size is measured by using particle size distribution (PSD) method. For $Al_2O_3$ particles according to the present invention, preferably, D10 is from 0.65 µm to 0.95 µm and D50 is from 1.15 µm to 1.55 µm and D90 is from 2 µm to 5 µm. Here, by D50 is meant average particle size.

The single crystal alumina filler having a fine particle size and narrow particle size distribution provides low bond line thickness and higher thermal conductivity. For example single crystal alumina filler BRA3X (Lot#21221-A), which is used in the examples is measured by using PSD Horiba LA950 giving D10 0.8 µm, D50 1.2 µm, D90 2.0 µnm, which shows a very narrow particle size distribution.

The single crystal alumina filler particles according to the present invention have preferably specific surface area of from 1 to 3 m²/g, preferably from 2 to 2.5 m²/g, wherein said specific surface area is measured by using Brenauer-Emmentt-Teller absorption method.

A die attach paste composition according to the present invention comprises a single crystal alumina filler preferably from 55% to 80% by weight of total paste composition, preferably from 60% to 80%, more preferably from 65% to 75%, even more preferably from 65% to 70%.

Hardener

The die attach paste according to the present invention comprises a hardener i.e. curing agent. The hardener is used to cure the organosilicone resin. The curing of organosilicon resin is completed by addition reaction between vinyl and hydride functional groups of organosilicon resin. Suitable hardener to be used herein needs to meet thermal conductive and electrical insulation requirements.

Useful hardeners for facilitating the hydrosilation curing reaction include precious metal hardeners such as those which use ruthenium, rhodium, palladium, osmium, iridium, and platinum, and complexes of these metals. Examples of suitable hydrosilation hardeners for use in the present invention are disclosed, for example, in U.S. Pat. Nos. 3,159,601 and 3,159,662 (Ashby); U.S. Pat. No. 3,814,730 (Karstedt); U.S. Pat. No. 3,516,946 (Modic), and U.S. Pat. No. 4,029,629 (Jeram).

Preferably, the hydrosilation hardener is a platinum-containing hardener. One preferred platinum-containing hardener to be used in the present invention is a platinum octanol complex containing 90.9 weight % octyl alcohol and 9.1 weight % chloroplatinic acid.

Another preferred platinum-containing hardener is a platinum complexes formed by reacting chloroplatinic acid (containing 4 moles of water) with tetravinylcyclotetrasiloxane in the presence of sodium bicarbonate in an ethanol solution. This hardener is disclosed in U.S. Pat. No. 3,775,452 to Karstedt.

The hardener must be used in a catalytic amount, which is that amount sufficient to promote the hydrosilation reaction. Generally, there must be utilized at least 0.1 parts per million of a platinum hardened in terms of parts of platinum metal.

The hardener used in the present invention should be latency so that the reaction can be suppressed at lower temperature and activated at higher temperature 100° C.

Due to high efficiency of Pt hardener, inhibitors may be added to prevent the reaction at lower temperature.

A die attach paste according to the present invention comprises hardener preferably from 0.05% to 1.05% by weight of organosilicone resin, more preferably from 0.1% to 1.0%, and most preferably from 0.2% to 0.5%.

Inhibitor

Because of the limited size for die in the LED field, the pin transfer technology has been utilized to control the amount of the paste. To ensure the desired pin transfer properties, die attach paste cannot be cured at room temperature. Inhibitors play a role in preventing hardening effect at lower temperatures and volatilizing at higher temperature without any residue. As a result, flash points of inhibitors are important and it is considered inhibitors with flash point above 100° C. are most appropriate. Inhibitors are incorporated into the die attach paste according to the present invention. It is believed that inhibitors can form a coordination bond with Pt catalysts to prevent their catalysis effect. In order to gain a better performance for the open time, complex inhibitors are preferred. Complex inhibitors are formed by combining 2 or more different kind of inhibitors and/or other related chemical compounds.

Suitable inhibitors to be used herein include 1-ethynyl-1-cyclohexanol, 3,5-dimethyl-1-hexyn-3-ol, 2-phenyl-3-butyn-2-ol, 1,3,5,7-tetramethyl-1,3,5,7-tetravinyl-cyclotetrasiloxane (MVC) etc. Preferred inhibitor to be used in the present invention is 2-phenyl-3-butyn-2-ol.

Suitable and preferred complex inhibitors to be used herein for example include the combination of 2-phenyl-3-butyn-2-ol and 1,3,5,7-tetramethyl-1,3,5,7-tetravinyl-cyclotetrasiloxane.

The die attach paste composition comprises an inhibitor preferably from 0.01% to 10% by weight of total paste composition, preferably from 0.5% to 5% and more preferably from 1% to 3%.

Optional Additives

The die attach paste according to the present invention may further comprise various optional additives. Optional additives further enhance certain properties of the die attach pastes such as adhesion strength.

Due to low polarity, adhesion properties of organosilicone resin based die attach paste to the metal substrates is not ideal. Especially when compared with other resins, such as epoxy and BMI, organosilicone resin's adhesion properties have a room for improvement. Therefore, it is preferable to include an adhesion promoter into the die attach paste according to the present invention to enhance adhesion strength to metal substrates. This is preferred especially for silver substrate in LED field.

Preferred adhesion promoters to be used in the present invention are for example β-(3,4-epoxycyclohexyl)ethyltrimethoxysilane, γ-glycidoxypropyltrimethoxysilane, γ-glycidoxypropyltrimethoxysilane and 3-acryloxypropyltrimethoxysilane.

Commercially available adhesion promoters are for example Silquest A186 and Silquest A187 from Momentive Performance Materials, Z6040 from Dow Corning and KBM5103 from Shin-etsu Chemical.

Silane coupling agents are preferred and some other special agents can be used for specific metal substrates such as anti-bleed agents.

Organic solvents can be used as additives in the die attach paste according to the present invention. Solvent are used to decrease viscosity of the die attach paste. Suitable organic solvents are for example low viscosity silicone oils. Suitable commercially available silicone oils to be used in the present invention are for example SF10 and SF50 from AB Specialty Silicones CO., LTD.

Optical brightening agents increase initial reflectivity and compositions comprising optical brightening agents still have very high reflectivity even after 168 hours ageing at 150° C., which is important property for LED applications. Therefore, preferably optical brightening agent may be added into the formulation to make sure high reflectivity and good anti-yellowing properties.

Suitable optical brightening agents to be used herein are for example titanium dioxide ($TIO_2$, R-105) from DuPont. Other preferred optical brightening agents are main organic compounds for example stilbene derivatives, coumarins, imidazolines, diazoles, triazoles, benzoxazolines, and mixtures thereof.

The die attach paste according to present invention is prepared according to the method comprising the steps of:

the silicone resins and inhibitor are mixed well by using Thinky mixer and subsequently heated at 60° C. for 30 mins;

filler and any optional ingredients are added into the mixture and mixed well by using Thinky mixer;

hardener is added at last and mixed thoroughly with a lower speed to make sure there is no reaction;

subsequent mixing is done by Three-roll mixer;

the prepared paste is placed into a syringe.

The die attach paste according to the present invention is cured at temperature of from 100 to 200° C., preferably at temperature of from 150 to 175° C. And the cure time is from 0.5 to 3 hours, preferably from 1 to 2 hours.

The die attach paste according to the present invention is used to attach a die on to a substrate. Suitable substrates are for example Au, Cu, plastics and Ag and Au coated substrates.

EXAMPLES

The example compositions were prepared according to the method described above.

Example 1—According to the Present Invention

| | | Formulation 1 | |
|---|---|---|---|
| Product Information | Product Name | wt (g) | wt % |
| Vinyl Silicone | VQM 1 | 4.000 | 18.849 |
| | VQM881 | 1.210 | 5.702 |
| Hydrogen Silicone | Crosslinker 110 | 0.300 | 1.414 |
| | SYL-OFF(R) 7672 | 0.700 | 3.299 |
| Inhibitor | 2-phenyl-3-butyn-2-ol | 0.124 | 0.584 |
| | MVC | 0.062 | 0.292 |
| Pt Catalyst | SIP6832.2 | 0.031 | 0.146 |
| Adhesion Promoter | A-186 | 0.124 | 0.584 |
| Alumina Filler | BRA3X | 14.670 | 69.130 |
| | AE9204 | | |
| | AE9104 | | |
| | A0802 | | |
| Total | | 21.221 | 100.000 |

Example 2—Comparative Example with Spherical Alumina Filler

| | | Formulation 2 | |
|---|---|---|---|
| Product Information | Product Name | wt (g) | wt % |
| Vinyl Silicone | VQM 1 | 4.000 | 18.849 |
| | VQM881 | 1.210 | 5.702 |
| Hydrogen Silicone | Crosslinker 110 | 0.300 | 1.414 |
| | SYL-OFF(R) 7672 | 0.700 | 3.299 |
| Inhibitor | 2-phenyl-3-butyn-2-ol | 0.124 | 0.584 |
| | MVC | 0.062 | 0.292 |
| Pt Catalyst | SIP6832.2 | 0.031 | 0.146 |
| Adhesion Promoter | A-186 | 0.124 | 0.584 |
| Alumina Filler | BRA3X | | |
| | AE9204 | 14.670 | 69.130 |
| | AE9104 | | |
| | A0802 | | |
| Total | | 21.221 | 100.000 |

Example 3—Comparative Example with Spherical Alumina Filler

| | | Formulation 3 | |
|---|---|---|---|
| Product Information | Product Name | wt (g) | wt % |
| Vinyl Silicone | VQM 1 | 4.000 | 18.849 |
| | VQM881 | 1.210 | 5.702 |
| Hydrogen Silicone | Crosslinker 110 | 0.300 | 1.414 |
| | SYL-OFF(R) 7672 | 0.700 | 3.299 |
| Inhibitor | 2-phenyl-3-butyn-2-ol | 0.124 | 0.584 |
| | MVC | 0.062 | 0.292 |
| Pt Catalyst | SIP6832.2 | 0.031 | 0.146 |
| Adhesion Promoter | A-186 | 0.124 | 0.584 |
| Alumina Filler | BRA3X | | |
| | AE9204 | | |
| | AE9104 | 14.670 | 69.130 |
| | A0802 | | |
| Total | | 21.221 | 100.000 |

Example 4—Comparative Example with Spherical Alumina Filler

| | | Formulation 4 | |
|---|---|---|---|
| Product Information | Product Name | wt (g) | wt % |
| Vinyl Silicone | VQM 1 | 4.000 | 18.849 |
| | VQM881 | 1.210 | 5.702 |
| Hydrogen Silicone | Crosslinker 110 | 0.300 | 1.414 |
| | SYL-OFF(R) 7672 | 0.700 | 3.299 |
| Inhibitor | 2-phenyl-3-butyn-2-ol | 0.124 | 0.584 |
| | MVC | 0.062 | 0.292 |
| Pt Catalyst | SIP6832.2 | 0.031 | 0.146 |
| Adhesion Promoter | A-186 | 0.124 | 0.584 |
| Alumina Filler | BRA3X | | |
| | AE9204 | | |
| | AE9104 | | |
| | A0802 | 14.670 | 69.130 |
| Total | | 21.221 | 100.000 |

Vinyl Silicones VQM1 and VQM0.6 manufactured by AB Specialty Silicones CO., LTD.; Vinyl Silicones VQM809 and VQM881 manufactured by Evonik Specialty Chemicals CO., LTD.; Hydrogen Silicone Crosslinker 110 manufactured by Evonik Specialty Chemicals CO., LTD.; Hydrogen Silicone SYL-OFF® 7672 manufactured by Dow Corning (China) Holding CO., LTD.; Catalyst SIP6832.2 manufactured by GELEST, INC.; Aluminum oxide BRA3X manufactured by BAIKOWSKI; Aluminum oxides AE9204, AE9104, A0802 manufactured by Admatechs CO., LTD.; Adhesion promoters A186 and A187 manufactured by Momentive Performance Materials; Adhesion promoter Z6040 manufactured by Dow Corning (China) Holding CO., LTD.; Adhesion promoter KBM5103 manufactured by Shin-Etsu Chemical; inhibitors 1-ethynyl-1-cyclohexanol, 3,5-dimethyl-1-hexyn-3-ol, 2-phenyl-3-butyn-2-ol manufactured by Sigma-Aldrich (Shanghai) Trading Co., Ltd.; inhibitor MVC supplied by AB Specialty Silicones CO., LTD.; Optical brightener Titanium Dioxide (R-105) manufactured by DuPont Titanium Technologies; solvents SF10, SF50 manufactured by AB Specialty Silicones CO., LTD.

Anti-yellowing property of the die attach paste according to the present invention were measured. In addition comparative examples by using spherical alumina filler were measured.

Sample (a) has single crystal alumina (BRA3X) as filler and sample (b) has spherical alumina filler (AE9204).

Measurement was made with Lambda 35, Perkin Elmer. And samples were prepared by preparing smooth films with the thickness about 0.3 mm from the die attach paste as described above. It is important that there is no bubble in the films.

Reflectivity is measured with the range of 300-800 nm initially for each sample, and then the samples are placed into the oven at 150° C. for 168 hours. The reflectivity is measured at 24, 48, 96, 120 and 168 hours respectively.

Figure 3:
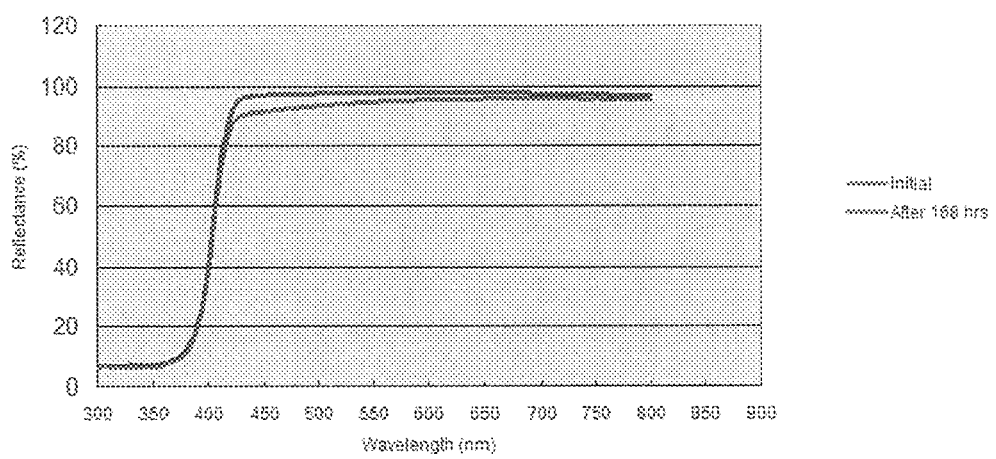
FIG. 3 is illustration of anti-yellowing properties of a die attach paste according to the present invention.
Figure 4:
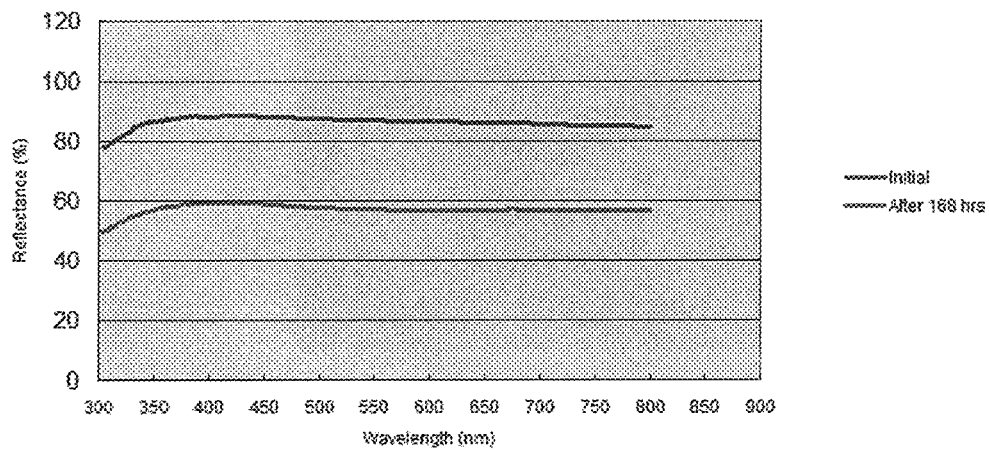
FIG. 4 is illustration of anti-yellowing properties of a comparative die attach paste.

The technical data shows that the die attach paste according to the present invention has better anti-yellowing properties versus the die attach paste comprising spherical alumina filler. The paste according to present invention has better reflectance after 168 hours in the oven. FIGS. 3 (according to the present invention) and 4 (comparative) illustrate these results.

Examples 5-9 were prepared according to the method described above to examine the effect of different types of silicone resins and resin compositions.

| Product Information | Product Name | 5 | 6 | 7 | 8 | 9 |
|---|---|---|---|---|---|---|
| Vinyl Silicone | VQM 0.6 | 4.000 | | | | 4.000 |
| | VQM 1 | | 4.000 | | 3.400 | |
| | VQM 809 | | | 3.400 | | |
| | VQM 881 | 1.210 | 1.210 | 2.010 | 2.010 | 1.410 |
| Hydrogen Silicone | Crosslinker 110 | 0.300 | 0.300 | 0.300 | 0.300 | 0.300 |
| | SYL-OFF(R) 7672 | 0.700 | 0.700 | 0.500 | 0.500 | 0.500 |
| RH | RH Content | 6.21 | 6.21 | 6.21 | 6.21 | 6.21 |
| Inhibitor | 2-phenyl-3-butyn-2-ol | 0.062 | 0.062 | 0.062 | 0.062 | 0.062 |
| | MVC | 0.124 | 0.124 | 0.124 | 0.124 | 0.124 |
| Pt Catalyst | SIP6832.2 | 0.016 | 0.016 | 0.018 | 0.018 | 0.018 |
| Adhesion Promoter | A-186 | 0.124 | 0.124 | 0.124 | 0.124 | 0.124 |
| Aluminum Oxide | BRA3X | 11.200 | 11.200 | 11.200 | 11.200 | 11.200 |
| Titanium Dioxide | R-105 | 2.800 | 2.800 | 2.800 | 2.800 | 2.800 |
| Total | | 20.536 | 20.536 | 20.538 | 20.538 | 20.538 |
| Filler % | | 68.17% | 68.17% | 68.17% | 68.17% | 68.17% |

Test Results for Examples 5-9

| Test Items | 5 | 6 | 7 | 8 | 9 |
|---|---|---|---|---|---|
| Viscosity | | | | | |
| 0.5 rpm (cPs) | 43909 | 79534 | 108530 | 86690 | 65449 |
| 5 rpm (cPs) | 10604 | 18972 | 24854 | 19800 | 14001 |
| TI Value (0.5 rpm/5 rpm) | 4.14 | 4.19 | 4.37 | 4.38 | 4.67 |
| Die Shear Strength (DSS) on Ag L/F (g) | | | | | |
| RT DSS | 1100.4 | 903.4 | 1371.1 | 1446.3 | 1365.3 |
| 260° C. HT DSS | 769.7 | 930.0 | 747.4 | 720.6 | 888.7 |
| Thermal (W/m·K) | 0.775 | 0.704 | 0.739 | 0.754 | 0.693 |
| Reflectivity | | | | | |
| 450 nm (initial) | 94.28% | 93.91% | 95.18% | 93.72% | 96.42% |
| 450 nm (168 h later at 150° C.) | 89.57% | 89.21% | 90.42% | 89.03% | 91.60% |

Viscosity has been measured according to STM D2983 by using Brookfield HBDV-III Rheometer (CP51 plate@0.5 rpm and 5 rpm, respectively).

Die Shear Strength (DSS) on Ag L/F (g) has been measured according to Mil-Std-883 Method 2019 with Die: 1 mm*1 mm Ag, Substrate: Ag L/F Substrate and Equipment: DAGE-SERIES-4000PXY.

TI Value (0.5 rpm/5 rpm) is viscosity at 0.5 rpm/viscosity at 5 rpm.

Examples 10-13 were prepared to examine the differences between different types of alumina fillers, especially the effect on thermal conductivity.

| Product Information | Product Name | 10 | 11 | 12 | 13 |
|---|---|---|---|---|---|
| Vinyl Silicone | VQM1 | 4.000 | 4.000 | 4.000 | 4.000 |
|  | VQM 881 | 1.210 | 1.210 | 1.210 | 1.210 |
| Hydrogen Silicone | Crosslinker 110 | 0.300 | 0.300 | 0.300 | 0.300 |
|  | SYL-OFF(R) 7672 | 0.700 | 0.700 | 0.700 | 0.700 |
| RH | RH Content | 6.21 | 6.21 | 6.21 | 6.21 |
| Inhibitor | 2-phenyl-3-butyn-2-ol | 0.062 | 0.062 | 0.062 | 0.062 |
|  | MVC | 0.124 | 0.124 | 0.124 | 0.124 |
| Pt Catalyst | SIP6832.2 | 0.016 | 0.016 | 0.016 | 0.016 |
| Adhesion Promoter | A-186 | 0.124 | 0.124 | 0.124 | 0.124 |
| Aluminum Oxide | BRA3X | 13.000 |  |  |  |
|  | AE9204 |  | 13.000 |  |  |
|  | AE9104 |  |  | 13.000 |  |
|  | AO802 |  |  |  | 13.000 |
| Total |  | 19.536 | 19.536 | 19.536 | 19.536 |
| Filler % |  | 66.55% | 66.55% | 66.55% | 66.55% |

Test Results for Examples 10-13

| Test Items | 10 | 11 | 12 | 13 |
|---|---|---|---|---|
| Viscosity | | | | |
| 0.5 rpm | 72906 | 5799 | 10702 | 130900 |
| 5 rpm | 19055 | 2734 | 3863 | 28665 |
| TI Value (0.5 rpm/5 rpm) | 3.83 | 2.12 | 2.77 | 4.57 |
| Die Shear Strength (DSS) on Ag L/F (g) | | | | |
| RT DSS | 1253.0 | 1024.3 | 1068.0 | 1283.1 |
| 260 deg C. HT DSS | 1077.0 | 772.8 | 838.5 | 1052.3 |
| Thermal (W/m · K) | 0.797 | 0.574 | 0.508 | 0.450 |
| Reflectivity | | | | |
| 450 nm (initial) | 84.95% | 83.26% | 80.38% | 82.59% |
| 450 nm (168 hrs later @ 150 deg C.) | 76.46% | 55.78% | 56.27% | 53.68% |

Examples 14-18 were prepared to examine the effect of different types of inhibitors to the open time. The definition of open time: the paste is dispensed into a container and let stand in the open air environment at 25° C. and measure the viscosity at different times. The time when viscosity is increased by 25% is defined as open time.

Examples 14-18

| Product Information | Product Name | 14 | 15 | 16 | 17 | 18 |
|---|---|---|---|---|---|---|
| Vinyl Silicone | VQM1 | 4.000 | 4.000 | 4.000 | 4.000 | 4.000 |
|  | VQM 881 | 1.210 | 1.210 | 1.210 | 1.210 | 1.210 |
| Hydrogen Silicone | Crosslinker 110 | 0.300 | 0.300 | 0.300 | 0.300 | 0.300 |
|  | SYL-OFF(R) 7672 | 0.700 | 0.700 | 0.700 | 0.700 | 0.700 |
| RH | RH Content | 6.21 | 6.21 | 6.21 | 6.21 | 6.21 |
| Inhibitor | 1-ethynyl-1-cyclohexanol |  | 0.124 |  |  |  |
|  | 3,5-dimethyl-1-hexyn-3-ol |  |  | 0.124 |  |  |
|  | 2-phenyl-3-butyn-2-ol |  |  |  | 0.124 | 0.062 |
|  | MVC |  |  |  |  | 0.124 |
| Pt Catalyst | SIP6832.2 | 0.016 | 0.016 | 0.016 | 0.016 | 0.016 |
| Adhesion Promoter | A-186 | 0.124 | 0.124 | 0.124 | 0.124 | 0.124 |
| Aluminum Oxide | BRA3X | 13.000 | 13.000 | 13.000 | 13.000 | 13.000 |
| Total |  | 19.350 | 19.474 | 19.474 | 19.474 | 19.536 |
| Filler % |  | 67.19% | 66.76% | 66.76% | 66.76% | 66.55% |

Open Times for Examples 14-18

| Test item | 14 | 15 | 16 | 17 | 18 |
|---|---|---|---|---|---|
| Open time | <1 h | 3-4 hrs | 5-6 hrs | ~8 hrs | >20 hrs |

Figure 5:
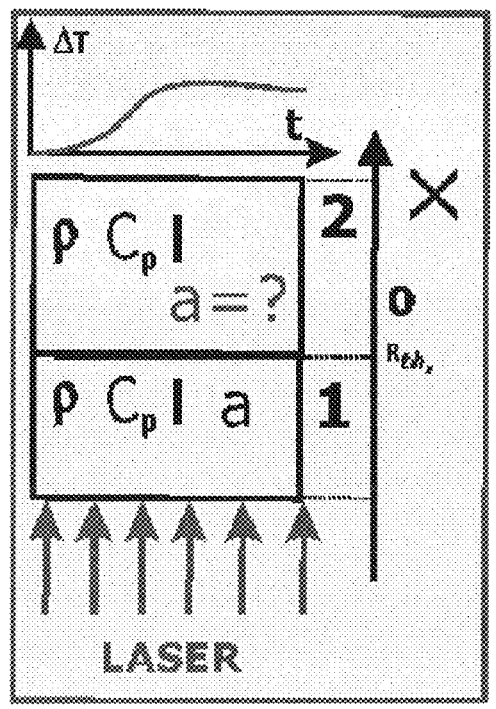
FIG. 5 is illustration of how the thermal conductivity of the samples is calculated.

Thermal Conductivity
Equipment:
CFA447 Nanoflash, NETZSCH COMPANY
Sample Preparation:
Round samples are made with the diameter of 12.7 mm and thickness of 0.6 mm. Four samples are prepared for each die attach paste and the average value is calculated. (To make sure there is no bubble in the samples)
Testing Condition:
Double layer mode is chose for measurement, which means graphite should be coated on the surface of samples. In a case of thermal conductivity of graphite and other parameters such as density, thickness, specific heat for the samples are known, thermal conductivity of the samples can be calculated. As illustrated in the FIG. 5. Layer 1 is graphite and layer 2 is the sample. When the heat is sent out from the laser, the heat will transfer from layer 1 to layer 2. The temperature change can be inspected as a function of time. By the temperature change and other known parameters such as density, specific heat, thickness and thermal conductivity of layer 1, the thermal conductivity of layer 2 can be calculated.

What is claimed is:

1. A die attach paste composition comprising
   (a) a organosilicone resin;
   (b) a single crystal alumina filler, wherein said single crystal alumina filler has ellipsoidal shape, has a particle size from 0.65 μm to 6 μm has a specific surface area of from 2 m$^2$/g to 3 m$^2$/g as measured by the Brunauer-Emmett-Teller (BET) absorption method;
   (c) a hardener; and
   (d) an inhibitor.
2. The die attach paste composition according to claim 1, wherein said organosilicone resin is a mixture of organosilicone resin comprising vinyl functional groups and organosilicone resin comprising hydride functional groups.
3. The die attach paste composition according to claim 1, wherein said organosilicone resin has the ratio of vinyl functional groups to hydride functional groups from 1:0.2 to 1:10.
4. The die attach paste composition according to claim 1, wherein said paste composition comprises organosilicone resin from 15% to 40% by weight of total paste composition, preferably from 17% to 37%, more preferably from 22% to 32%.
5. The die attach paste composition according to claim 1, wherein said single crystal alumina filler has particle size from 0.65 μm to 5 μm.
6. The die attach paste composition according to claim 1, wherein said paste composition comprises single crystal alumina filler from 55% to 80% by weight of total paste composition.
7. The die attach paste composition according to claim 1, wherein said single crystal alumina filler has specific surface area of from 2 m$^2$/g to 2.5 m$^2$/g.
8. The die attach paste composition according to claim 1, wherein said hardener is Pt containing hardener.
9. The die attach paste composition according to claim 1, wherein said paste composition comprises hardener from 0.05% to 1.05% by weight of organosilicone resin.
10. The die attach paste composition according to claim 1, wherein said inhibitor is selected from the group consisting of 1-ethynyl-1-cyclohexanol, 3,5-dimethyl-1-hexyn-3-ol, 2-phenyl-3-butyn-2-ol, 1,3,5,7-tetramethyl-1,3,5,7-tetravinyl-cyclotetrasiloxane (MVC) and combination of 2-phenyl-3-butyn-2-ol and 1,3,5,7-tetramethyl-1,3,5,7-tetravinyl-cyclotetrasiloxane.
11. The die attach paste composition according to claim 1, wherein said paste composition comprises inhibitor from 0.01% to 10% by weight of total paste composition.
12. The die attach paste composition according to claim 1, wherein said paste composition further comprises additives selected from the group consisting of adhesion promoter, solvent, silyl coupling agent, anti-bleed agent and optical brightening agents.
13. A die attach paste composition comprising
    (a) an organosilicone resin;
    (b) a single crystal alumina filler, wherein said single crystal alumina filler has ellipsoidal shape and a specific surface area of from 2 to 3 m$^2$/g as measured by the Brunauer-Emmett-Teller (BET) absorption method;
    (c) from 0.05 to 1.05 wt. %, by weight of the organosilicone resin, of hardener, wherein said hardener is a Pt containing hardener; and
    (d) from 0.5 to 5 wt. %, by weight of total paste composition, of inhibitor.
14. The die attach paste according to claim 13, wherein said inhibitor is a complex inhibitor.

* * * * *

UNITED STATES PATENT AND TRADEMARK OFFICE
CERTIFICATE OF CORRECTION

PATENT NO. : 9,796,898 B2
APPLICATION NO. : 15/255229
DATED : October 24, 2017
INVENTOR(S) : Long Fang, Wangsheng Fang and Wei Yao It is certified that error appears in the above-identified patent and that said Letters Patent is hereby corrected as shown below:

In the Specification

Column 3, Line 64: Change "molecule 3" to -- molecule $\geq 3$ --.

Column 4, Line 19: Change "molecule 3" to -- molecule $\geq 3$ --.

Column 4, Line 54: Change "$(R^4R^6SiO_{2/2})$" to -- $(R^4R^5SiO_{2/2})$ --.

Column 5, Line 64: Change "molecule 1" to -- molecule $\geq 1$ --.

Column 7, Line 20: Change "2.0 μnm" to -- 2.0 μm --.

Column 7, Line 67: Change "temperature 100° C" to -- temperature $\geq$100° C --.

Signed and Sealed this
Third Day of September, 2019

Andrei Iancu
*Director of the United States Patent and Trademark Office*